United States Patent
Strobel et al.

(10) Patent No.: US 10,232,727 B2
(45) Date of Patent: Mar. 19, 2019

(54) BATTERY SYSTEM

(71) Applicant: Robert Bosch GmbH, Stuttgart (DE)

(72) Inventors: Jens Strobel, Freidberg am Neckar (DE); Fabian Henrici, Los Altos, CA (US)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/102,583

(22) PCT Filed: Dec. 2, 2014

(86) PCT No.: PCT/EP2014/076172
§ 371 (c)(1),
(2) Date: Jun. 8, 2016

(87) PCT Pub. No.: WO2015/086369
PCT Pub. Date: Jun. 18, 2015

(65) Prior Publication Data
US 2016/0311339 A1    Oct. 27, 2016

(30) Foreign Application Priority Data
Dec. 9, 2013    (DE) .......................... 10 2013 225 250

(51) Int. Cl.
*H02J 7/00*    (2006.01)
*H02J 7/14*    (2006.01)
(Continued)

(52) U.S. Cl.
CPC .......... *B60L 11/1851* (2013.01); *H02J 7/0072* (2013.01); *B60L 11/1877* (2013.01);
(Continued)

(58) Field of Classification Search
USPC ....... 320/109, 107, 108, 132, 134, 135, 136, 320/137, 116, 118, 122, 103, 106, 126,
(Continued)

(56) References Cited

U.S. PATENT DOCUMENTS 5,495,503 A     2/1996  King et al.
5,578,914 A  *  11/1996  Morita .................. H01M 10/44
                                                       320/122
(Continued)

FOREIGN PATENT DOCUMENTS

CN    102640336 A    8/2012
DE    19814366      10/1999
(Continued)

OTHER PUBLICATIONS

International Search Report for Application No. PCT/EP2014/076172 dated Apr. 29, 2015 (English Translation, 3 pages).

*Primary Examiner* — Alexis B Pacheco
(74) *Attorney, Agent, or Firm* — Michael Best & Friedrich LLP

(57) ABSTRACT

The invention relates to a battery system (1), in particular for an electrically driven motor vehicle, having at least one battery sub-unit (2) and at least one high-power line (3), wherein the battery sub-unit (2) has at least one galvanic element (4), at least one power switching transistor (5), which is connected in series with the galvanic element (4) and via which the galvanic element (4) can be electrically conductively connected to the high-power line (3), at least one power bypass transistor (6), which is connected in parallel with the power switching transistor (5) and the galvanic element (4), and at least one electronic device (7), which is configured to acquire at least one operating parameter of the battery sub-unit (2) and has a communication link with the power switching transistor (5) and/or the power bypass transistor (6), wherein the electronic device (7) is configured to generate a data signal assigned to the operating parameter, in that the electronic device (7) activates the power switching transistor (5) and/or the power bypass transistor (6) electrically in such a way that the electrical resistance of the power switching transistor (5) and/or of the (Continued)

power bypass transistor (6) is modulated in at least one predefinable time interval, in order to modulate the level of the electric current flowing in the high-power line (3).

8 Claims, 2 Drawing Sheets

(51) Int. Cl.
 *B60L 11/18* (2006.01)
 *B60W 10/26* (2006.01)
 *B60W 20/00* (2016.01)

(52) U.S. Cl.
 CPC ... *B60L 2240/545* (2013.01); *B60L 2240/547* (2013.01); *B60W 10/26* (2013.01); *B60W 20/00* (2013.01); *H02J 7/1423* (2013.01); *Y02T 10/705* (2013.01); *Y02T 10/7011* (2013.01); *Y02T 90/16* (2013.01); *Y10S 903/907* (2013.01)

(58) Field of Classification Search
 USPC .................................... 320/162, 164
 See application file for complete search history.

(56) References Cited

U.S. PATENT DOCUMENTS

| | | | | |
|---|---|---|---|---|
| 6,265,846 | B1* | 7/2001 | Flechsig | H01M 10/441 320/116 |
| 6,975,094 | B1* | 12/2005 | Lascaud | H02J 7/0016 320/122 |
| 2002/0195994 | A1* | 12/2002 | Perelle | B60L 3/0046 320/116 |
| 2006/0038661 | A1 | 2/2006 | Reinhold et al. | |
| 2006/0132089 | A1 | 6/2006 | Ambrosio et al. | |
| 2010/0237829 | A1* | 9/2010 | Tatebayashi | H01M 4/661 320/118 |
| 2010/0244781 | A1* | 9/2010 | Kramer | H02J 7/0016 320/162 |
| 2012/0013304 | A1* | 1/2012 | Murase | B60L 11/1864 320/116 |
| 2012/0074898 | A1* | 3/2012 | Schwartz | H02J 7/0016 320/107 |
| 2012/0094150 | A1* | 4/2012 | Troutman | G01R 19/16542 429/50 |
| 2012/0187898 | A1* | 7/2012 | Nysen | H01M 10/052 320/103 |
| 2013/0009600 | A1* | 1/2013 | Jeong | B60L 11/005 320/118 |
| 2013/0234667 | A1* | 9/2013 | Norton | H01M 10/441 320/122 |
| 2013/0249474 | A1* | 9/2013 | Feuerstack | B60L 11/18 320/107 |
| 2014/0091751 | A1* | 4/2014 | Workman | H02J 7/0013 320/106 |
| 2014/0340047 | A1* | 11/2014 | Weissenborn | H02J 7/0024 320/135 |
| 2015/0236614 | A1 | 8/2015 | Schuler et al. | |

FOREIGN PATENT DOCUMENTS

| | | |
|---|---|---|
| DE | 102011087028 | 5/2013 |
| DE | 102012202754 A1 | 8/2013 |
| DE | 102012208454 | 11/2013 |
| DE | 102012208820 | 11/2013 |
| DE | 102012216469 | 3/2014 |
| JP | 2004015924 A | 1/2004 |
| JP | 2010119251 A | 5/2010 |
| WO | 2012171919 | 12/2012 |

\* cited by examiner

BATTERY SYSTEM

BACKGROUND OF THE INVENTION

In electrically driven motor vehicles, particularly electric vehicles and hybrid vehicles, secondary batteries are used for supplying electrical propulsion devices of the motor vehicles with electrical energy using these. First of all, corresponding secondary batteries generally have battery modules electrically interconnected to form a battery chain which, in turn, can have a number of electrically interconnected battery cells. The battery cells of a secondary battery can be designed, for example, as lithium ion battery cells.

To generate electrical energy of the required order of magnitude, the battery modules or battery cells, respectively, can be connected dynamically to a high-power line of the secondary battery or separated from the high-power line via power switching transistors. A battery module separated from the high-power line or a battery cell separated from the high-power line is usually bypassed by means of a power bypass transistor. These power electronics can form a part of a battery cell which usually has its own electronic unit and a galvanic element.

SUMMARY OF THE INVENTION

The subject matter of the invention is a battery system, particularly for an electrically driven motor vehicle, having at least one battery sub-unit and at least one high-power line, the battery sub-unit having at least one galvanic element, at least one power switching transistor which is connected in series with the galvanic element and via which the galvanic element can be electrically conductively connected to the high-power line, at least one power bypass transistor which is connected in parallel with the power switching transistor and the galvanic element, at least one electronic device which is configured for acquiring at least one operating parameter of the battery sub-unit and is connected communicatively to the power switching transistor and/or the power bypass transistor, with the electronic device being configured to generate a data signal allocated to the operating parameter, in that it electrically activates the power switching transistor and/or the power bypass transistor in such a manner that the electrical resistance of the power switching transistor and/or the power bypass transistor is modulated in at least one predefinable time interval.

By means of the inventive electrical activation of the power bypass transistor or of the power switching transistor, respectively, the electrical resistance of the power switching transistor and/or of the power bypass transistor is modulated in at least one predeterminable time interval as a result of which the intensity of an electrical current flowing in the high-power line is modulated. In particular, the intensity of an electric current flowing in the high-power line is raised above a current value to be expected without this activation, or lowered. Described generally, the electrical resistance of the power switching transistor and/or of the power bypass transistor is modulated with the aim of generating a detectable current change on the high-power line of the battery. As a consequence, the electrical voltage which can be picked up across the high-power line will also change. One or both quantities can be evaluated for receiving the data signal. By this means, a particular operating parameter of the battery sub-unit can be signaled and fed into the high-power line so that it can be evaluated, for example, by a higher-level electronic evaluation and control device. If more complex data signals are generated and fed into the high-power line, the power bypass transistor or the power switching transistor, respectively, can be correspondingly activated electrically in a number of successive predeterminable time intervals, for example periodically. Feeding the electrical current flowing through the power bypass transistor or the power switching transistor, respectively, into the high-power line is associated with a load modulation.

Within the context of the invention, an electrically driven motor vehicle can be, for example, a hybrid vehicle, a plug-in hybrid vehicle or an electric vehicle.

Within the context of the invention, the battery system can have two or more galvanic elements. A battery sub-unit can also have two or more galvanic elements. Alternatively, a battery sub-unit can have an individual galvanic element and thus be designed as conventional battery cell.

To each battery sub-unit, its own electronic device can be allocated which is configured for acquiring at least one operating parameter of the respective battery sub-unit. The battery sub-units can differ in their composition, for example in the number of their galvanic elements. Each battery sub-unit is preferably electrically conductively connectable to the high-power line via its own power switching transistor which is connected in series with the respective galvanic element. To each battery sub-unit its own power bypass transistor is preferably allocated which is connected in parallel with the respective power switching transistor and with the respective galvanic element.

The electronic device can be designed by normally present control electronics of a battery cell or by separate electronics. The operating parameter of the battery sub-unit, which can be acquired by an electronic device, can be acquired by means of a sensor. The operating parameter to be considered can be, for example, the temperature of a battery sub-unit, an electrical voltage generated by the at least one galvanic element, or the like. The data signal generated by an electronic device can also contain information on two or more different operating parameters of the respective battery sub-unit.

According to an advantageous embodiment, the electronic device is configured to generate a data signal allocated to the operating parameter in that it electrically activates the power bypass transistor, with closed power switching transistor and open power bypass transistor, and/or the power switching transistor with closed power bypass transistor and open power switching transistor, in such a manner that a part of an electrical current flowing in the high-power line flows through the power bypass transistor or the power switching transistor, respectively, in at least one predeterminable time interval.

According to an advantageous embodiment, the electronic device electrically activates the power bypass transistor or the power switching transistor, respectively, in such a manner that a gate voltage of the respective power transistor is lowered or raised by a predeterminable measure in the time interval. By this means, the power bypass transistor or the power switching transistor, respectively, is slightly closed or opened, that is to say its electrical resistance modulated so that in at least a predeterminable time interval, a part of the electrical current flowing in the high-power line can flow through the power bypass transistor or the power switching transistor, respectively, or the intensity of the electrical current flowing can be modulated, respectively.

The subject matter of the invention is also a battery system, particularly for an electrically driven motor vehicle, having at least one battery sub-unit and at least one high-power line, the battery sub-unit having at least one galvanic element, at least one power switching transistor which is connected in series with the galvanic element and via which the galvanic element can be electrically conductively connected to the high-power line, at least one power bypass transistor which is connected in parallel with the power switching transistor and with the galvanic element, and at least one electronic device which is configured for acquiring at least one operating parameter of the battery sub-unit and is connected communicatively to the power switching transistor and/or the power bypass transistor, with the electronic device being configured to generate a data signal allocated to the operating parameter, in that it electrically activates the power switching transistor, with opened power bypass transistor, in such a manner that at least one actual switching time of the power switching transistor deviates from a predetermined switching pattern by a predeterminable measure.

The deviation of the at least one actual switching time of the power switching transistor from a predetermined switching pattern by a predeterminable measure can be fed into the high-power line as a data signal which is allocated to an operating state of the battery sub-unit, and acquired. The deviation is preferably such that it lies within an existing specification (jitter) but can be acquired by a receiver as target-oriented communication. A switch-on time and/or a switch-off time of the power switching transistor can deviate from a predetermined switching pattern which can be deposited, for example, in a further electronic device and/or a higher-level central electronic device in order to be able to perform a calibration with actual switching times. In this context, actual switching times can be located in time before or after the switching times expected in accordance with the predetermined switching pattern. A switch-on time can also be disclosed oppositely to an immediately following switch-off time with respect to expected switching times.

According to a further advantageous embodiment, the electronic device is configured to receive and evaluate a data signal generated by an electronic device allocated to a further battery sub-unit. This provides for communication between the battery sub-units. All electronic devices of a battery can also be correspondingly designed.

According to a further embodiment, the battery system has at least one central electronic evaluation and control device which is electrically conductively connected to the high-power line and/or to a current sensor which measures the electrical current flowing through the high-power line and which is configured to receive and evaluate the data signal. The central electronic evaluation and control device can be placed at a higher level than the battery sub-units. Furthermore, the central electronic evaluation and control device can be formed by a conventional battery control unit (BCU). The central electronic evaluation and control device can measure the electrical current flowing in the high-power line of the battery in order to be able to receive a data signal from an electronic device. Alternatively, the electrical voltage or voltage modulation occurring at the ends of the high-power line, that is to say the outputs of the battery, can be measured by means of the central electronic evaluation and control device in order to receive a data signal.

A further advantageous embodiment provides that the central electronic evaluation and control device is configured to generate a data signal and to send it via the high-power line to at least one electronic device. This provides for bidirectional communication between the central electronic evaluation and control device and the electronic devices.

The subject matter of the invention is also a method for generating a data signal allocated to at least one operating parameter of a battery sub-unit of a battery, particularly of a battery of an electrically driven motor vehicle, the battery sub-unit having at least one galvanic element and at least one power switching transistor, the galvanic element being electrically conductively connectable to a high-power line of the battery via the power switching transistor, characterized in that the data signal is generated in that the power switching transistor is electrically activated in such a manner that at least one actual switching time of the power switching transistor deviates from a predetermined switching pattern by a predeterminable measure.

The advantages connected above with respect to the correspondingly designed battery system are correspondingly associated with this method.

The subject matter of the invention is also a use of a power transistor, connecting a battery sub-unit of a battery, particularly of a battery of an electrically driven motor vehicle, to a high-power line of the battery for generating a data signal allocated to at least one operating parameter of the battery sub-unit and for feeding the data signal into the high-power line. The power transistor can be designed as a power switching transistor or as a power bypass transistor.

The invention thus provides for a communication method for exchanging information between sensors and control devices within a battery system, particularly for lithium-ion battery systems, of electrically driven motor vehicles.

BRIEF DESCRIPTION OF THE DRAWINGS

In the text which follows, the invention will be explained by way of examples, using preferred exemplary embodiments, referring to the attached figures wherein the features represented in the text which follows can represent, both by themselves in each case and in various combinations with one another, an aspect of the invention. In the drawing.

DETAILED DESCRIPTION

Figure 1:
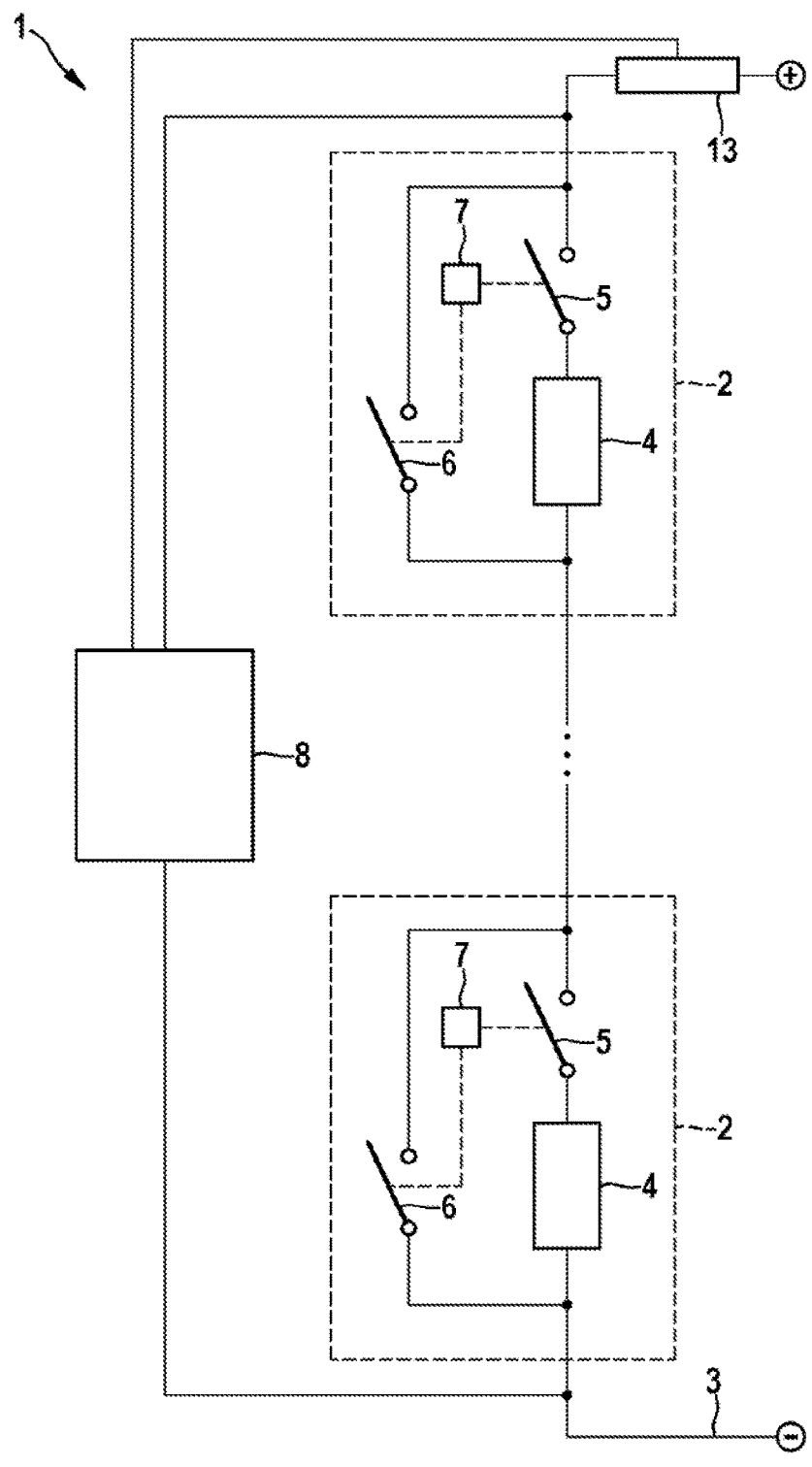
FIG. 1 shows a diagrammatic circuit of an exemplary embodiment of a battery system according to the invention.

FIG. 1 shows a diagrammatic circuit of an exemplary embodiment of a battery system 1 according to the invention. The battery system 1 comprises a number of series-connected battery sub-units 2, designed as battery cells, and a high-power line 3.

Each battery sub-unit 2 has a galvanic element 4, power electronics formed from a power switching transistor 5 and a power bypass transistor 6, and an electronic device 7. The power switching transistors 5 are connected in series with the respective galvanic elements 4. The galvanic elements 4 can be connected to the high-power line 3 via the respective power switching transistor 5. The power bypass transistors 6 are connected in parallel with the respective power switching transistor 5 and with the respective galvanic element 4. The electronic devices 7 are configured for acquiring at least one operating parameter of the respective battery sub-unit 2.

The power switching transistors 5 and the power bypass transistors 6 are in their respective open positions.

The battery system 1 also comprises a central electronic evaluation and control device 8 which is electrically conductively connected to the high-power line 3. By this means, the electrical voltage present in the high-power line 3 can be acquired. The central electronic evaluation and control device 8 is also connected to the high-power line 3 via a current sensor 13 in order to be able to acquire the electrical current flowing in the high-power line 3.

Each electronic device 7 is configured to generate a data signal allocated to the operating parameter in that it electrically activates the power switching transistor 5 and/or the power bypass transistor 6 in such a manner that the electrical resistance of the power switching transistor 5 and/or of the power bypass transistor 6 is modulated in at least one predeterminable time interval. For this purpose, each electronic device 7 can be configured to activate the power bypass transistor 6, with closed power switching transistor 5 and open power bypass transistor 6, and/or the power switching transistor 5, with closed power bypass transistor 6 and open power switching transistor 5, electrically in such a manner that a part of an electrical current flowing in the high-power line 3 flows through the power bypass transistor 6 or the power switching transistor 5, respectively, in at least one predeterminable time interval. For this purpose, each electronic device 7 activates the respective power bypass transistor 6 or the respective power switching transistor 5 electrically in such a manner that a gate voltage of the respective power transistor 6 or 5 is lowered or raised by a predeterminable measure in the time interval.

Alternatively, each electronic device 7 can be configured to generate a data signal allocated to the operating parameter in that it electrically activates the power switching transistor 5, with open power bypass transistor 6, in such a manner that at least one actual switching time of the power switching transistor 5 deviates from a predetermined switching pattern via a predeterminable measure. This is illustrated in FIG. 2.

Each electronic device 7 is also configured to receive and evaluate a data signal generated by an electronic device 7 allocated to a further battery sub-unit 2. The central electronic evaluation and control device 8 is also configured to receive and evaluate the data signal. Furthermore, the central electronic evaluation and control device 8 is configured to generate a data signal itself and to send it via the high-power line 3 to at least one electronic device 7.

Figure 2:
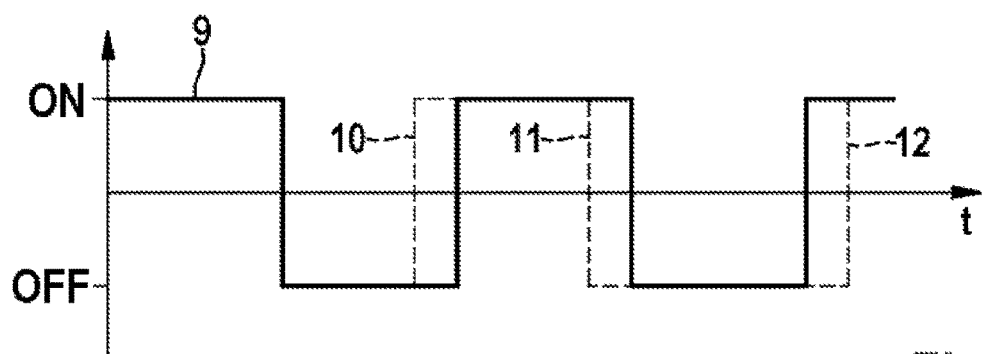
FIG. 2 shows a diagrammatic representation of an electronic activation of a power transistor according to one exemplary embodiment of a battery system according to the invention.

FIG. 2 shows a diagrammatic representation of an electronic activation of a power switching transistor 5 according to one exemplary embodiment of a battery system 1 according to the invention. The continuous line 9 represents a predetermined switching pattern. In dashed lines 10, 11 and 12, actual switching times are shown which deviate from predetermined switching times of the predetermined switching pattern by a predeterminable measure. The actual switching times 10 and 11 are located before the switching times expected according to the switching pattern whereas the actual switching time 12 is located after the switching time expected according to the switching pattern. By means of these deviations of the actual switching times from expected switching times, the binary units of 0 and 1 can be coded.

The invention claimed is:

1. A battery system (1) having at least one battery sub-unit (2) and at least one high-power line (3), the battery sub-unit (2) having
   at least one galvanic element (4),
   at least one power switching transistor (5) connected in series with the galvanic element (4) and via which the galvanic element (4) is electrically conductively connected to the high-power line (3),
   at least one power bypass transistor (6) connected in parallel with the power switching transistor (5) and with the galvanic element (4), and
   at least one electronic device (7) configured to acquire at least one operating parameter of the battery sub-unit (2) connected communicatively to the power switching transistor (5) and/or the power bypass transistor (6),
   the electronic device (7) configured to generate a data signal allocated to the operating parameter, in that the electronic device (7) electrically activates the power switching transistor (5) and/or the power bypass transistor (6) in such a manner that the electrical resistance of the power switching transistor (5) and/or the power bypass transistor (6) is modulated in at least one predeterminable time interval in order to modulate the level of the electrical current flowing in the high-power line (3); and
   wherein that the electronic device (7) is configured to generate a data signal allocated to the operating parameter in that the electronic device (7) electrically activates the power bypass transistor (6), with closed power switching transistor (5) and opened power bypass transistor (6), and/or the power switching transistor (5), with closed power bypass transistor (6) and open power switching transistor (5), in such a manner that a part of the electrical current flowing in the high-power line (3) flows through the power bypass transistor (6) or the power switching transistor (5), respectively, in at least one predeterminable time interval.

2. The battery system (1) as claimed in claim 1, characterized in that the electronic device (7) electrically activates the power bypass transistor (6) or the power switching transistor (5), respectively, in such a manner that a gate voltage of the respective power transistor (5, 6) is lowered or raised by a predeterminable measure in the time interval.

3. The battery system (1) as claimed in claim 1, characterized in that the electronic device (7) is configured to receive and evaluate a data signal generated by an electronic device (7) allocated to a further battery sub-unit (2).

4. The battery system (1) as claimed in claim 1, characterized by at least one central electronic evaluation and control device (8) configured to receive and evaluate the data signal, the at least one central electronic evaluation and control device (8) connected electrically conductively to the high-power line (3) and to a current sensor which measures the electrical current flowing through the high-power line (3).

5. The battery system (1) as claimed in claim 4, characterized in that the central electronic evaluation and control device (8) is configured to generate a data signal and to send it to at least one electronic device (7) via the high-power line (3).

6. The battery system (1) as claimed in claim 1, wherein the battery system (1) is for an electrically driven motor vehicle.

7. The battery system (1) as claimed in claim 1, characterized by at least one central electronic evaluation and control device (8) configured to receive and evaluate the data signal, the at least one central electronic evaluation and control device (8) connected electrically conductively to the high-power line (3).

8. The battery system (1) as claimed in claim 1, characterized by at least one central electronic evaluation and control device (8) configured to receive and evaluate the data signal, the at least one central electronic evaluation and control device (8) connected electrically conductively to a current sensor which measures the electrical current flowing through the high-power line (3).

\* \* \* \* \*